United States Patent
Knodel et al.

(10) Patent No.: US 9,342,071 B2
(45) Date of Patent: May 17, 2016

(54) AUTOMATED PROCESS FOR HOLDING PRODUCTS AT PREDEFINED POINTS DURING MANUFACTURING

(75) Inventors: Kurt D. Knodel, Rochester, MN (US);
Kari A. Fischer, Rochester, MN (US);
Ivory W. Knipfer, Rochester, MN (US);
Christopher M. Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/935,918

(22) Filed: Nov. 6, 2007

(65) Prior Publication Data

US 2009/0118853 A1  May 7, 2009

(51) Int. Cl.
*G06F 19/00* (2011.01)
*G05B 19/418* (2006.01)
*G06Q 10/00* (2012.01)

(52) U.S. Cl.
CPC .......... *G05B 19/41865* (2013.01); *G06Q 10/00* (2013.01); *G05B 2219/32042* (2013.01); *Y02P 90/20* (2015.11)

(58) Field of Classification Search
CPC .............. G05B 2219/45031; G05B 19/41865; G05B 19/4189; G05B 2219/31429; G05B 2219/31432; G05B 19/418; G05B 2219/32252; G05B 2219/32258; H01L 21/67276; H01L 21/67745; H01L 25/50
USPC ............ 700/96, 105, 108, 109, 110; 705/7, 8, 705/26
See application file for complete search history.

(56) References Cited

U.S. PATENT DOCUMENTS

| | | | | |
|---|---|---|---|---|
| 5,121,319 A * | 6/1992 | Fath et al. | | 700/83 |
| 7,031,784 B1 * | 4/2006 | Lai | | G05B 19/41865 700/121 |
| 7,123,975 B2 * | 10/2006 | Chen | | G06Q 10/087 700/106 |
| 7,136,825 B2 * | 11/2006 | Araki et al. | | 705/9 |
| 7,254,457 B1 * | 8/2007 | Chen | | G06Q 50/04 700/100 |
| 2002/0198618 A1 * | 12/2002 | Madden et al. | | 700/101 |
| 2004/0111339 A1 * | 6/2004 | Wehrung et al. | | 705/30 |
| 2005/0038541 A1 | 2/2005 | Clark et al. | | |
| 2005/0246046 A1 | 11/2005 | Gifford et al. | | |
| 2005/0256597 A1 * | 11/2005 | Chao | | G05B 19/41865 700/96 |
| 2005/0267617 A1 * | 12/2005 | Chao et al. | | 700/100 |
| 2005/0278050 A1 * | 12/2005 | Ruml et al. | | 700/100 |
| 2006/0052897 A1 * | 3/2006 | Liao | | 700/108 |
| 2006/0100731 A1 * | 5/2006 | Sugihara et al. | | 700/108 |
| 2006/0122721 A1 * | 6/2006 | Ouchi | | 700/105 |
| 2006/0173726 A1 * | 8/2006 | Hall et al. | | 705/8 |
| 2006/0293779 A1 | 12/2006 | Nishri | | |
| 2010/0057507 A1 * | 3/2010 | Berberich | | G06Q 10/063114 705/7.26 |

* cited by examiner

*Primary Examiner* — Darrin Dunn
(74) *Attorney, Agent, or Firm* — Steven M. Greenberg, Esq.; CRGO Law

(57) ABSTRACT

Embodiments of the present invention address deficiencies of the art in respect to manufacturing production and provide a method, system and computer program product for mass hold management and routing processing. In one embodiment of the invention, a method for halting, initiating or resuming production of a product during a manufacturing process can be provided. The method can include defining criteria that must be met by a work unit and defining a point in the manufacturing process. The method can further include applying the criteria to a plurality of work units currently in the manufacturing process. The method can further include identifying at least one work unit of the plurality of work units that meets the criteria, responsive to said applying the criteria to the plurality of work units, and halting, initiating or resuming manufacturing of the at least one work unit at the point.

12 Claims, 5 Drawing Sheets

AUTOMATED PROCESS FOR HOLDING PRODUCTS AT PREDEFINED POINTS DURING MANUFACTURING

BACKGROUND OF THE INVENTION

1. Field of the Invention

The present invention relates to commercial manufacturing processes, and more particularly to hold routing management for commercial manufacturing processes.

2. Description of the Related Art

Large-scale manufacturing systems typically involve complex distributed supply and demand networks. A manufacturing facility generally includes a large number of production lines producing many products having multiple process steps and process sequences in manufacturing the final product. Changes in market supply and demand can cause a great deal of uncertainty in production demand, and purchase orders frequently may need to be halted, changed or rescheduled. If the order cannot be halted, rescheduled or updated methodically in a timely fashion, delays in production can occur.

For various reasons, a manufacturer may desire to temporarily stop the manufacturing process on a subset of products being produced. Quality concerns are one example, wherein ad hoc quality assurance checks are performed at certain points in a process. Another example is a scenario where products are manufactured prior to having the signoffs necessary before shipping a product to the customer. When these incidents occur, it is often necessary to hold product orders at a strategic point part-way through the manufacturing process. (Note that a work unit refers to an incomplete product undergoing manufacturing wherein the work unit may refer to one part of a larger whole.) If a work unit is not progressed to this point, the customer shipment dates may be missed and expected revenue from the products may dwindle. If a work unit is allowed to move beyond this point, the final products may require re-working, thereby creating extra workload and delays in shipment. Allowing work units to move beyond a strategic point may also increase the possibility that a final product may inadvertently ship without receiving the required re-work.

Yet another example of why a manufacturer may desire to temporarily stop the manufacturing process on a subset of products being produced is an unannounced product. In cases of an unannounced product, the manufacturer may wish to pre-build the product in anticipation of the announcement of the new product. Consequently, a hold must be placed on the new product to prevent shipment prior to the announced product availability date.

Conventional automated solutions simply halt the continuation of a work unit through manufacturing for any and all its process sequences. This approach stops all work in progress on a work unit at the exact location and time when the halt is issued, whether the work unit is in the build phase, test phase, clean and claim phase, etc. Therefore, the above approach does not allow for strategic start and stop of manufacturing at future positions in the manufacturing process. This prevents manufacturing from completing as much of the process as possible for the given circumstances, thereby jeopardizing customer shipments and company revenue. Further, the conventional automated solutions operate at a complete customer order level rather then discrete work unit levels. Consequently, when such a hold is placed, all work units associated with the customer order are stopped at their current routing, even if it is not necessary.

Another approach to this problem includes manual intervention, which involves an individual dealing with each individual work unit going through the manufacturing process. This approach is labor intensive, involving analysis to select which work units must be halted, locating and marking the identified work units, and forcing a stop of the manufacturing process at the appropriate time on the individual work units. This highlights the need for a system whereby it is noted which units have been halted and why each unit has been halted. This would help to discern between multiple work units which have been halted for different reasons.

The above labor-intensive approach is also prone to error. Orders can be accidentally overlooked, and there is not a way to query which work units have been held in process. This approach is further time intensive, creating the potential for inadvertent shipments of incorrect products. While working through a list of affected work units, those work units not immediately addressed will continue to move through the manufacturing process and could inadvertently ship without a required rework or signoff. Inadvertent shipping of a work unit may occur because the conventional approach does not allow for halting future activities.

BRIEF SUMMARY OF THE INVENTION

Embodiments of the present invention address deficiencies of the art in respect to manufacturing production and provide a novel and non-obvious method, system and computer program product for mass hold management and routing processing. In one embodiment of the invention, a method for halting, initiating or resuming production of a product during a manufacturing process can be provided. The method can include defining criteria that must be met by a work unit and defining a point in the manufacturing process. The method can further include applying the criteria to a plurality of work units currently in, or awaiting the start of, the manufacturing process. The method can further include identifying at least one work unit of the plurality of work units that meets the criteria, responsive to said applying the criteria to the plurality of work units, and making a record indicating that manufacturing of the at least one work unit must be halted, initiated or resumed at the point.

In another embodiment of the invention, a mass manufacturing production planning and routing method can be provided for halting, initiating or resuming production of a product during a manufacturing process. The method can include defining at least one attribute value for a work unit, wherein an attribute comprises at least one of a part identifier and a model identifier and defining a routing of the manufacturing process and a point either before or after the routing. The method can further include reading attribute values of a plurality of work units currently in, or awaiting the start of, the manufacturing process and comparing them to the set of attribute values that were defined. The method can further include identifying at least one work unit with attribute values that match the set of attribute values that were defined, responsive to said applying the criteria to the plurality of work units, and making a record indicating that manufacturing of the at least one work unit must be halted, initiated or resumed at the point.

In yet another embodiment of the invention, a manufacturing production planning and routing computer system for halting, initiating or resuming production of a product during a manufacturing process can be provided. The system can include a repository for storing criteria that must be met by a work unit and a point in the manufacturing process. The system further can include processor configured for applying the criteria to a plurality of work units currently in, or awaiting the start of, the manufacturing process and identifying at least one work unit of the plurality of work units that meets the criteria. Finally, the system can include an interface for providing an output instruction for halting, initiating or resuming manufacturing of the at least one work unit at the point.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for halting, initiating or resuming production of a product during a manufacturing process. In accordance with an embodiment of the present invention, the method includes defining criteria that must be met by a work unit and defining a point in the manufacturing process. Next, the criteria are applied to a plurality of work units currently in, or awaiting the start of, the manufacturing process. Work units that meet the criteria are identified and a record is made indicating that manufacturing of the identified work units must be halted, initiated or resumed at the point. The present invention maximizes the manufacturing process by minimizing interruptions insofar as it only halts the work units affected by a halt. The present invention further provides advanced visibility of halted items, thereby allowing for planning for impacts to production due to a hold. The present invention further improves the ability to meet customer shipment dates.

Figure 1:
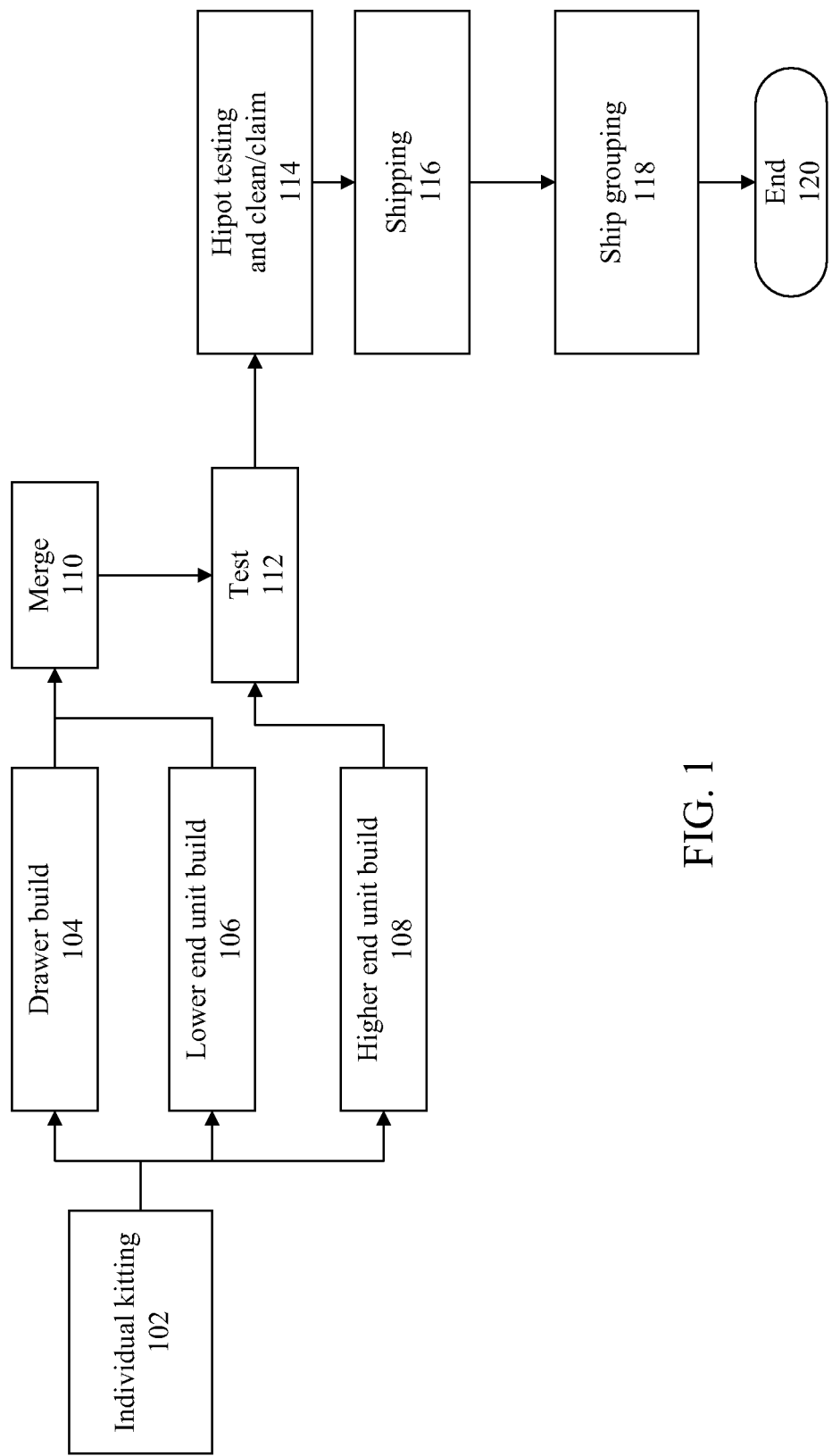
FIG. 1 is a block diagram illustrating a conventional manufacturing process for a product.

FIG. 1 is a block diagram illustrating a conventional manufacturing process for a product. In the embodiment of FIG. 1, the final product being manufactured is a multi-drawer rack mounted server system comprising multiple computer components. Each routing of the manufacturing process is represented by a block. A routing is defined as one or more manufacturing steps assembled together as a grouping.

Routing 102 comprises the kitting process that includes a procedure for acquiring a kit for each work unit in the product being manufactured. Each work unit begins with a kit that includes all of the components that comprise the work unit being manufactured. Routing 102 comprises the acquisition of each component necessary for manufacturing of the work units. From routing 102, three separate routings are spawned. The drawer unit is manufactured in routing 104, the lower end computer unit is manufactured in routing 106 and the higher end computer unit is manufactured in routing 108.

The output of routings 104 and 106 are merged in routing 110. Subsequently, the output of routings 110 and 108 are tested in routing 112. Next, the product undergoes high-potential testing and clean/claim procedures in routing 114. High-potential testing involves the testing of a unit for stray currents at high voltages. The clean/claim procedure involves the physical cleaning and quality assurance checking of the work unit.

In routing 116, the work unit undergoes a shipping process wherein the work unit is properly packed and prepared for shipping. In routing 118, a ship group is assembled, which includes the aggregation of the packed work unit and other items associated with the packed work unit, such as manuals, user's guides or other printed material. The manufacturing process of FIG. 1 ends in step 120.

Figure 2:
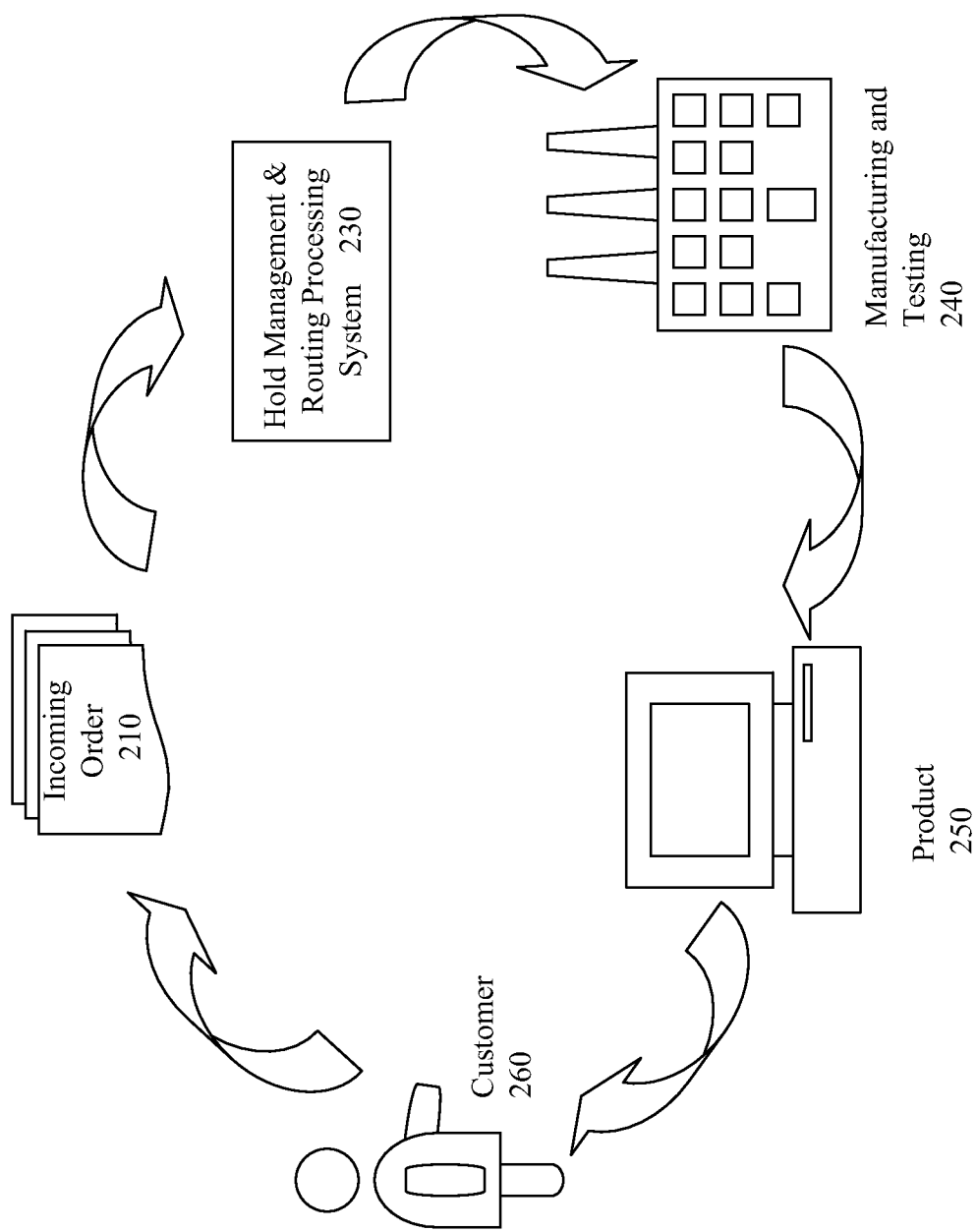
FIG. 2 is an illustration of a manufacturing production network incorporating intelligent mass hold management and routing processing, according to one embodiment of the present invention.

FIG. 2 is an illustration of a manufacturing production network incorporating intelligent mass hold management and routing processing, according to one embodiment of the present invention. The process depicted by FIG. 2 beings with a customer 260 placing an order 210 via a web site, telephone or mail. In advanced manufacturing environments where products are "built to customer order," an incoming order 210 can be processed by mass hold management and routing processing system 230 wherein intelligent mass hold management and routing processing can be invoked to enable halting, initiating or resuming manufacturing of certain work units at predefined points. During intelligent mass hold management and routing processing 230, halting, initiating or resuming work units can be implemented efficiently without losing manufacturing work. Thereafter, a produced product 250 can be passed through manufacturing and testing 240 and ultimately to the customer 260.

Figure 3:
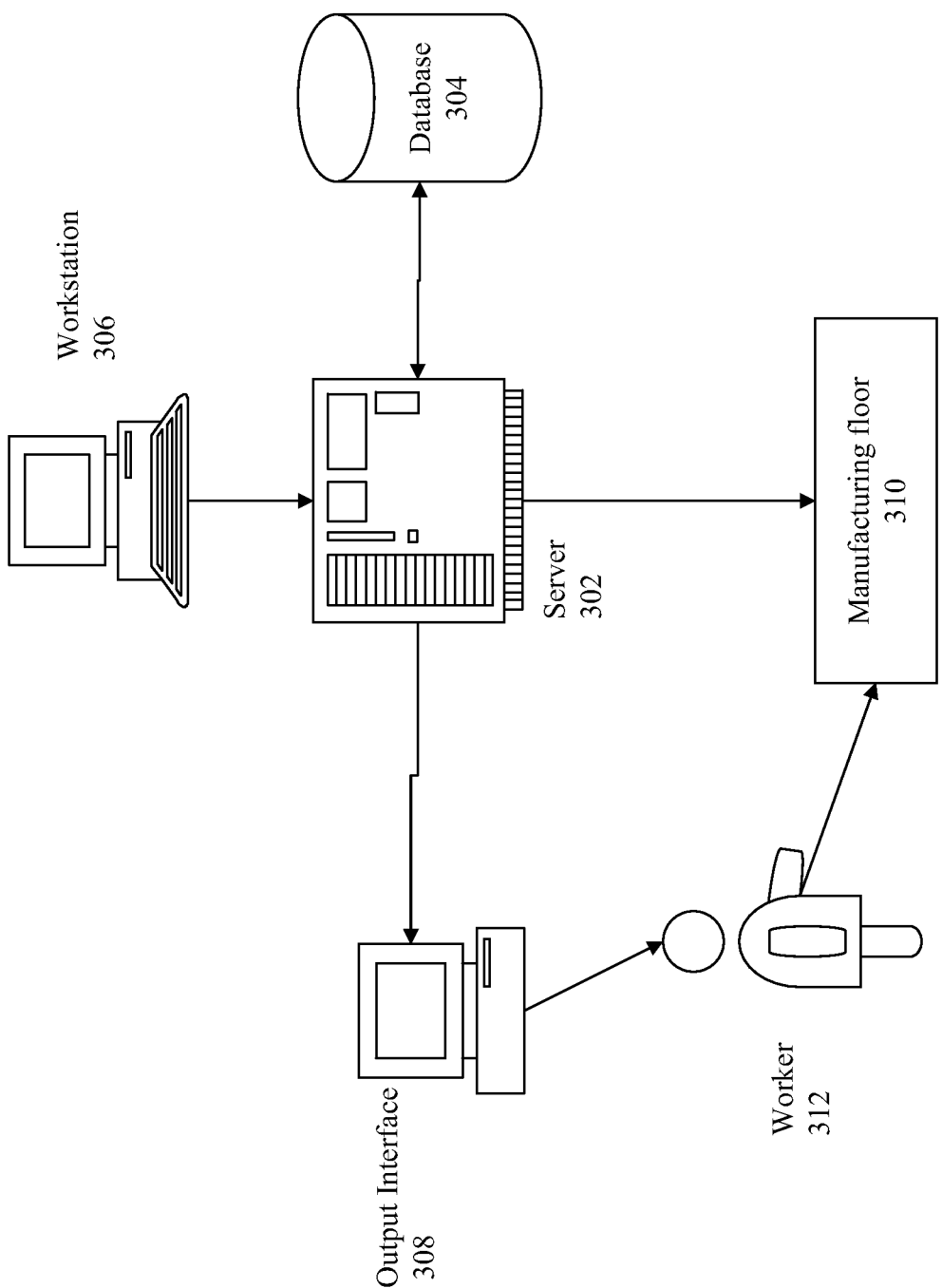
FIG. 3 is a block diagram showing the various components of a scheme for enabling halting of manufacturing of certain work units at predefined points in a mass production system, according to one embodiment of the present invention.

FIG. 3 is a block diagram showing the various components of a scheme for enabling halting, initiating or resuming of manufacturing of certain work units at predefined points in a mass production system, according to one embodiment of the present invention. FIG. 3 includes a server 302 that represents a processor performing the functions of the mass hold management and routing processing system 230. The server 302 performs the automated steps for enabling halting, initiating or resuming of manufacturing of certain work units at predefined points in a mass production system.

FIG. 3 shows a work station 306 which may be used by an administrator or other worker for inputting rules for identifying work units for halting at predefined points. These rules may also be received by other means such as over a network. The server 302 stores the rules in the database 304. The rules are applied to the orders and/or work units currently undergoing, or awaiting the start of, the manufacturing process (see FIG. 4 for a more detailed description of the rule application process). As a result of the application of the rules, the server 302 makes a record identifying the work units for which manufacturing must be halted, initiated or resumed at a defined point in the manufacturing process. The server 302 further effectuates this halt, initiation or resumption by interfacing with the manufacturing floor 310 of the manufacturing process and thereby halting, initiating or resuming manufacturing of the identified work units at the defined point. Alternatively, the server 302 may output to the output interface 308 the record identifying the work units for which manufacturing must be halted, initiated or resumed. In this alternative, the record is viewed by worker 312, who subsequently physically interfaces with the manufacturing floor 310 of the manufacturing process and halts, initiates or resumed manufacturing of the identified work units at the defined point.

The rules, as identified above, are used to identify work units for halting, initiating or resuming at predefined points. The rules may be input into server 302 by an administrator or other worker via work station 306. A rule may take various forms. In one embodiment of the present invention, a rule is a text string that identifies a hold group and hold criteria, as described below.

A hold group comprises: 1) an identity of at least one routing and 2) an indicator indicating whether the work unit(s) shall be halted, initiated or resumed before and/or after the at least one identified routing. The indicator comprises the point, or points, at which manufacturing shall be halted, initiated or resumed for the affected work units. A hold group may further include a unique identifier for the hold group, a text description of the hold group, and an on/off indicator that defines whether the hold group is currently activated.

A hold criterion comprises: 1) a list of conditions that must be met, and 2) identifiers for at least one hold group to which the hold criteria applies. A hold criteria may further include a unique identifier for the hold criteria, a text description of the hold criteria, and an on/of indicator that defines whether the hold criteria is currently activated. A hold criterion my further include an indicator of whether to apply the hold criteria to new orders, such as order 210 of FIG. 2.

The list of conditions of hold criteria may be articulated by specifying statements about attributes of work units and attributes of orders for products. Attributes of a work unit may include a product name, a model number, a part number (work unit contains or does not contain a part number), a type, a location of production and a current production status (such as started, un-started, at a particular routing, past a particular routing, etc.). Attributes of an order may include an order date, a shipment date, a build date, an order priority, and an order type (such as domestic, international, server, etc.).

In short, hold criteria are a set of statements that, if true, produce a match. That is, any work unit or order that meets the hold criteria produces a match. In one embodiment of the present invention, the hold criteria is specified by listing one or more attribute values that, if present in a work unit, produces a match. An attribute value may be specified in a positive manner, wherein the existence of the specified attribute value produces a match. For example, a hold criteria that specifies a "model number=550" would produce a match with a work unit having a model number of 550. Alternatively, an attribute value may be specified in a negative manner, wherein the lack of the specified attribute value produces a match. For example, a hold criteria that specifies a "model number=NOT 550" would produce a match with a work unit having a model number of 770. Further, attribute values may be specified in a range such that any attribute value that falls within that range produces a match. For example, a hold criteria that specifies a "500<model number<700" would produce a match with a work unit having a model number of 600. Additionally, attribute values may be specified using a wildcard. For example, a hold criteria that specifies a "model number=6" would produce a match with a work unit having a model number 655**.

Figure 4:
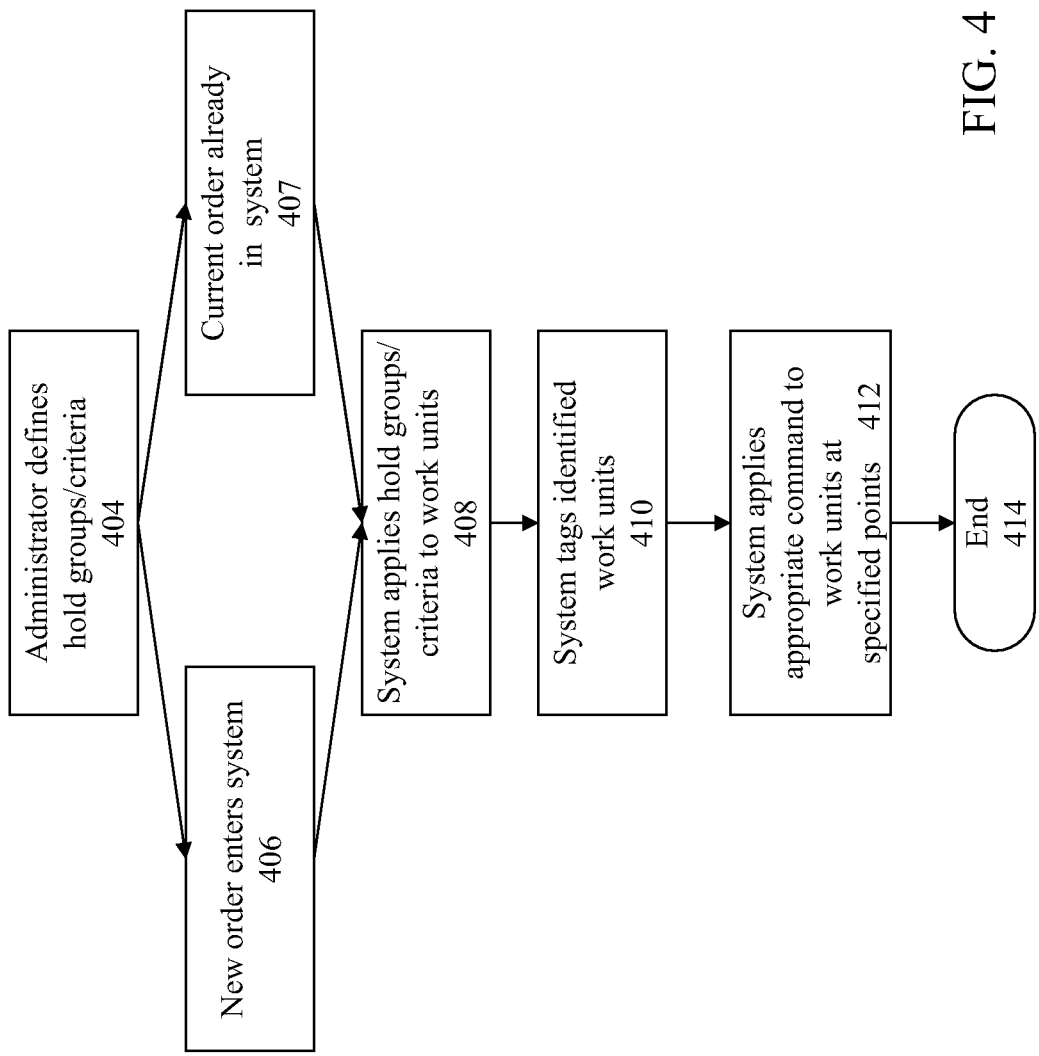
FIG. 4 is a flow chart depicting a general process for handling orders and halting, initiating or resuming manufacturing of certain work units at predefined points, according to one embodiment of the present invention.

FIG. 4 is a flow chart depicting a general process for handling orders and halting, initiating or resuming manufacturing of certain work units at predefined points, according to one embodiment of the present invention. The process of FIG. 4 may be executed by mass hold management and routing processing system 230.

In step 404, an administrator or other worker may input the rules into server 302 via work station 306, as described above in greater detail. In step 406, a new or incoming order (such as incoming order 210 of FIG. 2), enters the mass hold management and routing processing system 230 and is processed. Alternatively, in step 407, an order already in the mass hold management and routing processing system 230 is processed.

In step 408, the mass hold management and routing processing system 230 applies the rules to the orders and/or work units currently undergoing, or awaiting the start of, the manufacturing process. Application of the rules to orders and work units comprises reading the attribute values defined in the rules and searching for those attribute values in the orders and/or work units currently undergoing the manufacturing process. When matching attribute values are found in an order or work unit, that order or work unit is considered a match.

In step 410, the server 302 tags the matching orders or work units for a halt, initiation or resumption at the defined point. Step 410 may comprise making a record identifying: 1) the orders or work units for which manufacturing must be halted, initiated or resumed and 2) a defined point, or points, in the manufacturing process where the halting, initiation or resumption shall occur. In step 412, the affected work units or orders are halted, initiated or resumed at the defined point or points. As explained above, the server 302 effectuates this halt, initiation or resumption by interfacing with the manufacturing floor 310 and halting, initiating or resuming manufacturing of the identified work units at the defined point. Alternatively, the server 302 may output the record to the output interface 308 and a worker 312 subsequently physically interfaces with the manufacturing floor 310 of the manufacturing process and halts, initiates or resumes manufacturing of the identified work units at the defined point.

Figure 5:
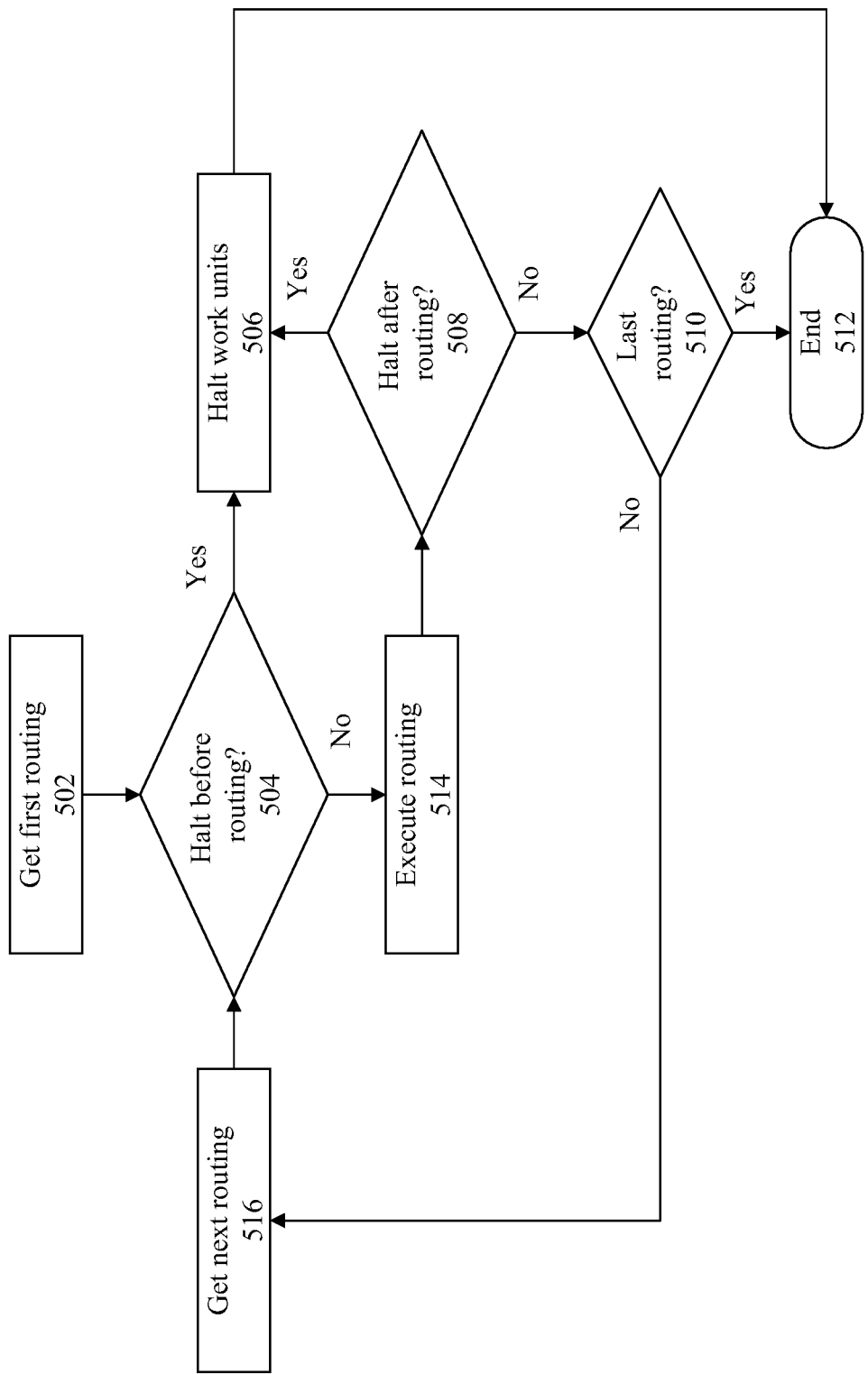
FIG. 5 is a flow chart depicting a process executed by a mass hold management and routing processing system for halting, initiating or resuming manufacturing of certain work units at predefined points, according to one embodiment of the present invention.

FIG. 5 is a flow chart depicting a process executed by a mass hold management and routing processing system 230 for halting manufacturing of certain work units at predefined points, according to one embodiment of the present invention. FIG. 5 shows the process by which the mass hold management and routing processing system 230 of FIG. 2 processes each routing of the manufacturing process, so as to enable halting manufacturing of certain work units at predefined points, after certain work units have been tagged for halting during the process of FIG. 4.

In step 502, a first routing of a set of work units is accessed. In step 504 it is determined whether the work units have been tagged for halting before the current routing, as specified in step 410 of FIG. 4. If the result of this determination is positive, the control flows to step 506. Otherwise, control flows to step 514, wherein the current routing is executed in its entirety. In step 506, the work units are halted and information pertaining to the current status of the work units, including a manufacturing history, is stored (such as in database 304).

In step 508, it is determined whether the work units have been tagged for halting after the current routing, as specified in step 410 of FIG. 4. If the result of this determination is positive, the control flows to step 506. Otherwise, control flows to step 510. In step 510, it is determined whether the current routing is the last routing of the manufacturing process for the work units. If the result of this determination is positive, the control flows to step 512 where the control flow of FIG. 5 ends. Otherwise, control flows to step 516, wherein the next routing of the manufacturing process for the work units is accessed and step 504 is executed anew.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, within a computer hardware system, for halting production of at least one work unit used to manufacture a product during a manufacturing process, comprising:
    defining, for the product during the manufacturing process, a plurality of routings, each routing of the plurality of routings identifying a point before or after a process defined by the routing;
    creating different hold groups in memory of the computer hardware system, each of the hold group comprising (1) an identity of one or more of the routings and (2) an indicator indicating whether work units of the routings should be halted, initiated or resumed before or after the at least one identified routing, the indicator comprising a point at which manufacturing is to be halted, initiated or resumed for the work units;
    defining, for each identified point, a holding criteria, the holding criteria identifying a corresponding one of the hold groups to which the holding criteria applies;
    receiving, by the computer hardware system, a request for a hold on one or more of the hold groups;
    determining, by the computer hardware system and upon receiving the request and identifying that one or more work units of the one or more of the hold groups will reach one point of the identified points, and that the one or more of the hold groups meets the holding criteria of the one point; and
    creating, by the computer hardware system and upon each of the one or more work units of the one or more of the hold groups meeting the holding criteria, a record indicating that the one or more of the work units is to be held at the one point.

2. The method of claim 1, wherein the holding criteria includes a set of attribute values for a work unit.

3. The method of claim 1, wherein the holding criteria includes a set of attribute values of an order of a work unit.

4. The method of claim 3, wherein
    an attribute of the order comprises at least one of an order identifier, a customer identifier, and a shipment date.

5. A computer hardware system for halting production of at least one work unit used to manufacture a product during a manufacturing process, comprising:
    a repository storing
        a plurality of routings for the product during the manufacturing process, each routing of the plurality of routings identifying a point before or after a process defined by the routing,
        different hold groups, each of the hold groups comprising (1) an identity of one or more of the routings and (2) an indicator indicating whether work units of the routings should be halted, initiated or resumed before or after the at least one identified routing, the indicator comprising a point at which manufacturing is to be halted, initiated or resumed for the work units; and
        a holding criteria for each identified point, the holding criteria identifying a corresponding one of the hold groups to which the holding criteria applies; and
    at least one processor, the at least one processor configured to
        receive a request for a hold on one or more of the hold groups;
        determine, upon receiving the request and identifying that one or more work units of the one or more of the hold groups will reach one point of the identified points, and that the one or more of the hold groups meets the holding criteria of the one point; and
        create, upon each of the one or more work units of the one or more of the hold groups meeting the holding criteria, a record indicating that the one or more of the work units is to be held at the one point.

6. The computer hardware system of claim 5, wherein
    the holding criteria includes a set of attribute values for a work unit.

7. The computer hardware system of claim 5, wherein
    the holding criteria includes a set attribute values of an order of a work unit.

8. The computer hardware system of claim 7, wherein
    an attribute of the order comprises at least one of an order identifier, a customer identifier, and a shipment date.

9. A computer program product comprising a computer usable memory device having stored therein computer usable program code for halting production of at least one work unit used to manufacture a product during a manufacturing process, the computer usable program code, which when executed by a computer hardware system, causes the computer hardware system to perform creating different hold groups in memory of the computer hardware system, each of the hold group comprising (1) an identity of one or more of the routings and (2) an indicator indicating whether work units of the routings should be halted, initiated or resumed before or after the at least one identified routing, the indicator comprising a point at which manufacturing is to be halted, initiated or resumed for the work units;

defining, for each identified point, a holding criteria, the holding criteria identifying a corresponding one of the hold groups to which the holding criteria applies;

receiving, by the computer hardware system, a request for a hold on one or more of the hold groups;

determining, by the computer hardware system and upon receiving the request and identifying that one or more work units of the one or more of the hold groups will reach one point of the identified points, and that the one or more of the hold groups meets the holding criteria of the one point; and creating, by the computer hardware system and upon each of the one or more work units of the one or more of the hold groups meeting the holding criteria, a record indicating that the one or more of the work units is to be held at the one point.

10. The computer program product of claim 9, wherein the holding criteria includes a set of attribute values for a work unit.

11. The computer program product of claim 9, wherein the holding criteria includes a set attribute values of an order of a work unit.

12. The computer program product of claim 11, wherein an attribute of the order comprises at least one of an order identifier, a customer identifier, and a shipment date.

* * * * *